E. P. CURREY.
SPRING CONNECTION.
APPLICATION FILED SEPT. 27, 1917.

1,265,623.

Patented May 7, 1918.

E. P. Currey
Inventor

By Geo. P. Kimmel
Attorney

UNITED STATES PATENT OFFICE.

ENOS P. CURREY, OF TOLEDO, OREGON.

SPRING CONNECTION.

1,265,623.   Specification of Letters Patent.   Patented May 7, 1918.

Application filed September 27, 1917. Serial No. 193,492.

*To all whom it may concern:*

Be it known that I, ENOS P. CURREY, a citizen of the United States, residing at Toledo, in the county of Lincoln and State of Oregon, have invented certain new and useful Improvements in Spring Connections, of which the following is a specification.

This invention relates to springs and it is the dominant object of the invention to provide an improved end connection for the leaves of springs such as shown and claimed in my co-pending application wherein the various spring leaves are arranged in superposed spaced relation, the end connection serving as means for preventing contacting of the spring leaves during flexing of the same, thus eliminating "squeaking," crystallization or lubricating of the same.

Other objects will be in part obvious and in part pointed out hereinafter.

The invention accordingly consists in the features of construction, combination of elements and arrangement of parts which will be exemplified in the construction hereinafter set forth, and the scope of the application of which will be indicated in the following claims.

Figure 1:
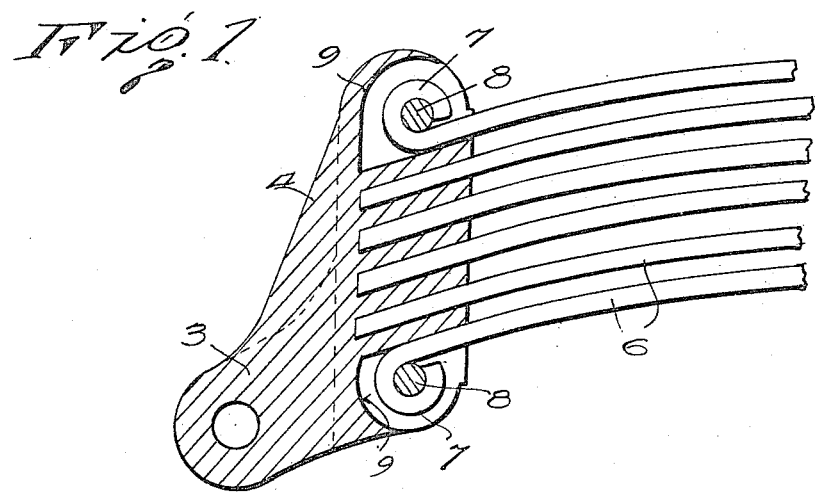
Figure 2:
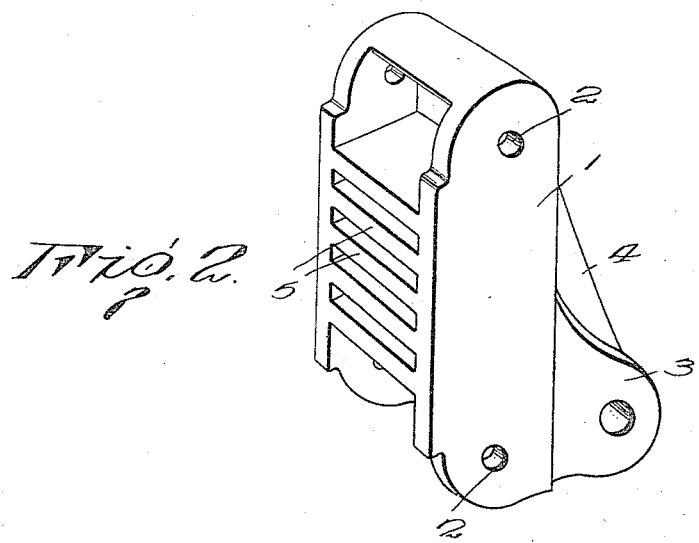

In the accompanying drawings, wherein is shown one of various possible embodiments of my invention, Figure 1 is a side elevation of the improved connection as applied to the fragment of a spring construction wherein the various leaves of the same are arranged in superposed spaced relation; and Fig. 2 is a perspective of the improved end connection.

Having more particular reference to the drawings and in connection with which like reference characters will refer to corresponding parts throughout the several views, the improved connection includes a bracket 1 substantially U-shaped in cross section and having horizontally alined openings 2 formed in the upper and lower extremities thereof. Upon the rear sides of the bracket 1 there is formed a diagonally disposed apertured bearing lug 3, which lug as will be understood, affords means whereby connection may be made between the spring and a portion of the device to which it is attached. As means for bracing the apertured bearing lug 3, a web 4 is formed integral with the bracket and the same, extending longitudinally of the bracket, as clearly shown in the drawings.

Supporting pieces generally indicated by the numeral 5 are formed integral with the opposite sides of the U-shaped bracket 1 and are arranged diagonally of the same in spaced apart relation. Thus, the various ends of the leaf springs 6 may be inserted between the supporting elements 5, while the upper and lower spring leaves are rolled upon themselves as at 7 and receive bolts 8 therethrough, the extremities of the said bolts passing through the horizontally alined openings 2 formed in the sides of the bracket 1. By so connecting the upper and lower spring leaves with the bracket, it will be readily appreciated that undue displacement of the intermediate leaves with relation to the diagonally disposed supporting elements 5 will be prevented. However, the opposite sides of the spring leaves will be prevented from contacting during flexing of the same, irrespective of the stress applied thereto.

As shown in Fig. 1, the upper and lower portions of the rear wall of the U-shaped bracket 1 are curved as at 9, thus providing efficient bearing surfaces for the rolled ends 7 of the upper and lower spring leaves 6 and permitting proper functioning of the same at all times.

From the foregoing, it will be understood by workers skilled in the art that I have provided a highly efficient form of end connection for springs, wherein the various leaves of the same are arranged in spaced superposed relation. Contacting of the adjacent sides of the spring leaves will be positively prevented and as a consequence, squeaking, crystallization or the necessity of lubricating of the same is eliminated, as hereinbefore stated.

Manifestly, the construction shown is capable of considerable modification and such modification as is within the scope of my claims, I consider within the spirit of my invention.

I claim:—

1. An end connection for springs, including a bracket having horizontally alined openings formed in the upper and lower extremities thereof, spaced supporting elements arranged on the bracket intermediate said horizontally alined openings for receiving the ends of spring leaves thereon, other leaves of the spring having ends receivable between the alined openings, bolts passing through said openings and supporting said last mentioned ends, and an apertured bearing lug formed integral with one side of the bracket to permit securing of the same to an object.

2. An end connection for springs, including a bracket substantially U-shaped in cross section having horizontally alined openings formed in the upper and lower extremities thereof, spaced superposed supporting elements arranged on the bracket intermediate the alined openings and extending diagonally across the bracket, and an apertured bearing lug formed integral with the rear side of said bracket.

3. An end connection for springs, including a bracket having spaced superposed supports extending diagonally thereacross for receiving the ends of springs thereon, and an apertured bearing lug formed integral with the bracket to permit securing of the same to an object.

4. In a spring a plurality of spaced superposed leaves, brackets substantially U-shaped in cross section having alined openings formed in the upper and lower extremities thereof, spaced superposed supporting elements arranged on the bracket and extending diagonally thereacross for receiving the ends of said leaves thereon, others of said leaves having ends rolled and arranged between the horizontally alined openings, fastening means passing through the openings and said rolled ends, and an apertured bearing lug formed integral with the rear side of the bracket to permit securing of the same to an object.

In testimony whereof, I affix my signature hereto.

ENOS P. CURREY.

Copies of this patent may be obtained for five cents each, by addressing the "Commissioner of Patents, Washington, D. C."